United States Patent [19]

Urai et al.

[11] 4,378,396

[45] Mar. 29, 1983

[54] SEAT CUSHION COVER MEMBER

[76] Inventors: Muneharu Urai; Tadafumi Abe, both of Tokyo; Youichiro Haraguchi, Hamuramachi; Koji Hayashi, Tokyo, all of Japan

[21] Appl. No.: 203,402

[22] Filed: Oct. 27, 1980

Related U.S. Application Data

[62] Division of Ser. No. 102399, Dec. 11, 1979, Pat. No. 4,313,776.

[30] Foreign Application Priority Data

Dec. 14, 1978 [JP] Japan ................................ 53-153621
Dec. 20, 1978 [JP] Japan ................................ 53-156297

[51] Int. Cl.³ .......................... B32B 5/18; B32B 3/06
[52] U.S. Cl. .................................. 428/198; 428/286; 428/308.4
[58] Field of Search ............ 428/198, 286, 310, 308.4; 156/220, 273, 281, 289, 290; 5/448, 480, 481

[56] References Cited

U.S. PATENT DOCUMENTS

| 3,244,571 | 4/1966 | Weisman | 156/290 |
| 3,266,066 | 8/1966 | Bereday | 5/481 |
| 4,229,240 | 10/1980 | Borgiani | 5/480 |

*Primary Examiner*—Paul J. Thibodeau
*Attorney, Agent, or Firm*—Oldham, Oldham, Hudak, Weber & Sand Co.

[57] ABSTRACT

A method of and an apparatus for producing a seat cushion member by laminating a sheet of decorative surface material, a sheet of usual polyurethane foam material and a reinforcing web of fabric material in the above order, and subjecting the laminate to heating by a conventional heating unit and, at the same time, to high-frequency dielectric heating by a high-frequency welder to locally fuse required portions of the sheet of usual polyurethane foam material thereby welding the three layers into an integral structure.

3 Claims, 10 Drawing Figures

SEAT CUSHION COVER MEMBER

This is a division of application Ser. No. 102,399, filed on Dec. 11, 1979, now U.S. Pat. No. 4,313,776.

BACKGROUND OF THE INVENTION

This invention relates to a method of and an apparatus for producing a seat cushion member by laminating a sheet of decorative surface material, a sheet of usual or untreated polyurethane foam material and a reinforcing web of fabric material into an integral three-layer structure without the use of a welding material or an adhesive, and it relates also to a product thereby obtained.

An inexpensive seat cushion member may be produced by welding a sheet of decorative surface material, a sheet of usual or untreated polyurethane foam material and a reinforcing web of fabric material into an integral structure by a high-frequency welder. However, it has been difficult to commercially produce such an inexpensive seat cushion member due to the fact that the untreated polyurethane foam material would not be fused at the temperature of high-frequency dielectric heating by the high-frequency welder. It has therefore been a common practice to employ a sheet of treated resin foam material such as so-called weldafoam or a sheet of low-melting-point polyurethane foam material, which is expensive but has appreciable weldability, in lieu of the inexpensive sheet of untreated polyurethane foam material, or to impregnate the untreated polyurethane foam material with a welding material such as nylon in powder foam, and then, to weld these three layers together by the high-frequency welder.

The products produced according to the prior art practice have however been defective in that the three layers constituting the products are insufficiently or unstably welded together and the costs of the products are inevitably high due to the fact that the weldafoam or the low-melting-point polyurethane foam material are not fully satisfactory in their weldability although they are expensive, and an impregnating equipment and operators for operating the equipment are also required for the impregnation of the untreated polyurethane foam material with the welding material such as powdery nylon.

STATEMENT OF OBJECTS

With a view to obviate such defects of the prior art practice and the products produced thereby, it is a primary object of the present invention to provide a method of and an apparatus for producing an inexpensive seat cushion member by welding a sheet of decorative surface material, a sheet of untreated polyurethane foam material and a reinforcing web of fabric material together into a completely integrally, laminated structure utilizing a conventional high-frequency welding equipment, that is, without requiring any special equipment.

In accordance with one aspect of the present invention, there is provided a method of producing a seat cushion member comprising the steps of laminating a sheet of surface material, a sheet of usual or untreated polyurethane foam material and a reinforcing web of fabric material in the above order, and subjecting said three-layer laminate to high-frequency dielectric heating by high-frequency welding means while, at the same time, heating it by conventional heating means, thereby locally fusing at least required portions of said sheet of untreated polyurethane foam material so as to weld said three layers into an integral structure.

In accordance with another aspect of the present invention, there is provided an apparatus for producing a seat cushion member by welding a sheet of surface material, a sheet of usual or untreated polyurethane foam material and a reinforcing web of fabric material into an integral structure, said apparatus comprising high-frequency welding means including a pair of an upper plate and a lower plate, and conventional heating means disposed on the entire surface of at least one of the upper plate and the lower plate of said high-frequency welding means, the heating operation of said heating means being carried out substantially in concurrent relation with the high-frequency welding operation of said high-frequency welding means.

In accordance with a further aspect of the present invention, there is provided a seat cushion member comprising a sheet of surface material, a sheet of usual or untreated polyurethane foam material and a reinforcing web of fabric material laminated in the above order and produced by the above mentioned method, said sheet of untreated polyurethane foam material being fused at least at required portions to be welded integrally to both of said sheet of surface material and said reinforcing web of fabric material.

BRIEF DESCRIPTION OF DRAWINGS

The present invention will now be described in detail with reference to the accompanying drawings, in which:

FIG. 3b is an enlarged view of the portion A in FIG. 3a;

DETAILED DESCRIPTION

The method of producing a seat cushion member according to the present invention will now be described in detail with reference to the accompanying drawings.

Figure 1:
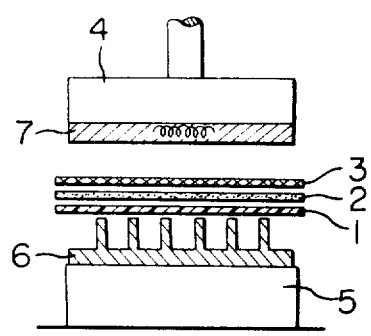
FIG. 1 is a schematic vertical sectional view of a high-frequency welding apparatus employed in combination with a conventional heating unit for producing a seat cushion member according to the method of the present invention.
Figure 2:
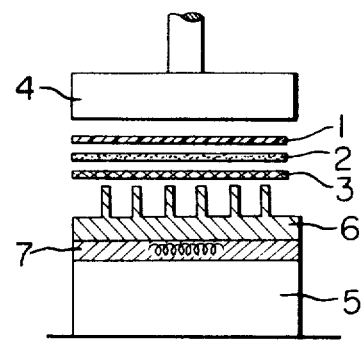
FIG. 2 is a view similar to FIG. 1 but showing another form of the apparatus.

FIGS. 1 and 2 show two forms of welding apparatus for producing a seat cushion member according to the method of the present invention. In each of FIGS. 1 and 2, a three-layer laminate of a sheet of decorative surface material 1, a sheet of usual or untreated polyurethane foam material 2 and a reinforcing web of fabric material 3 is inserted between an upper plate 4 of a high-frequency welder and a mold 6 mounted on a lower plate 5 of the high-frequency welder. A sheet of electrical insulator (not shown) is interposed between the upper plate 4 of the high-frequency welder and the reinforcing web of fabric material 3 on the sheet of decorative surface material 1 for the purpose of preventing sparks tending to generate thereacross. In FIG. 1, the sheet of decorative surface material 1 forms the lowermost layer of the three-layer laminate although it provides the upper surface layer of the product. The upper plate 4 of the high-frequency welder functions also as a pressure imparting ram. In FIG. 1, a heating unit 7 of electric heating, steam heating or any other suitable type is shown mounted on the upper plate 4 of the high-frequency welder. In FIG. 2, this heating unit 7 is shown mounted between the lower plate 5 of the high-frequency welder and the mold 6. In another form of the apparatus shown in FIG. 4, the mold 6 is mounted on a movable table or shuttle 8 so as to be movable along a straight path relative to the upper and lower plates 4 and 5 of the high-frequency welder in the directions shown by the arrows, and the heating unit 7 is shown mounted on the upper plate 4 of the high-frequency welder. In still another form of the apparatus shown in FIG. 5, a plurality of molds 6 are mounted on a turntable 9 so as to be movable along a circular path relative to the upper and lower plates 4 and 5 of the high-frequency welder in the directions shown by the arrows, and the heating unit 7 is also mounted on the upper plate 4 of the high-frequency welder.

Figure 3A:
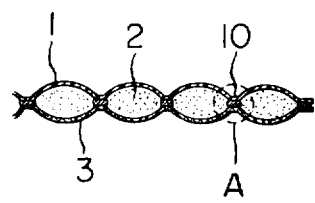
FIG. 3a is a schematic sectional view of part of the seat cushion member produced by the method according to the present invention.
Figure 3B:
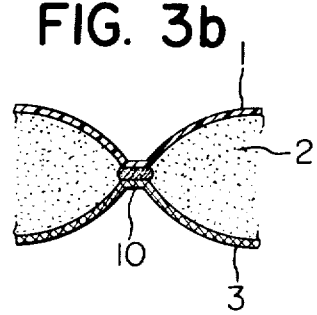

The three-layer laminate composed of the sheet of decorative surface material 1, the sheet of untreated polyurethane foam material 2 and the reinforcing web of fabric material 3 is then heated by the combination of the high-frequency welder and the heating unit 7 to be fused at least at the required portions of the three layers. Consequently, as seen in FIGS. 3a and 3b, the three layers are entirely welded together while being compressed at the welded portions 10 to which the molding pressure is imparted. The product thus obtained is the integrally welded three-layer structure composed of the sheet of decorative surface material 1, the sheet of untreated polyurethane foam material 2 and the reinforcing web of fabric material 3.

The untreated polyurethane foam material, for example, that used for producing a machine-sewn seat cushion member is not fused when it is merely heated at the temperature of high-frequency dielectric heating, whereas an expensive special polyurethane foam material such as a low-melting-point polyurethane foam material can be easily fused by merely heating it at the temperature of high-frequency dielectric heating.

When a weldable sheet of decorative surface material 1, for example, a sheet of vinyl resin-based artificial leather, a sheet of untreated polyurethane foam material 2, which is not fused at the temperature of high-frequency dielectric heating, and a reinforcing web of fabric material 3 are laminated to provide a three-layer laminate and are then welded together by externally applying heat at a suitable temperature from the heating unit 7 while, at the same time, energizing the high-frequency welder, the sheet of decorative surface material 1 may be fused at the outside surface thereof in addition to its inside surface, and unattractive scars giving an unbeautiful external appearance may by produced on that surface when the sheet of decorative surface material 1 is disposed opposite to the heating unit 7. Further, due to excessive fusion of the sheet of decorative surface material 1, this sheet may be extremely thinned or severed or scorched.

It is therefore preferable to dispose the reinforcing web of fabric material 3 opposite to the heating unit 7 as shown in FIG. 1 or 2. When the three-layer laminate including the reinforcing web of, for example, vinyl resin-based artificial leather 3 is heated by energizing both the heating unit 7 and the high-frequency welder, the reinforcing web of vinyl resin-based artificial leather 3 may be partly fused by the heat generated from the heating unit 7 and also from the mold 6 of the high-frequency welder, and unattractive scars may appear on the outside surface of the reinforcing web of vinyl resin-based artificial leather 3. However, such scars are present on the back surface of the seat cushion member, and the beautiful external appearance on the seat cushion member is not impaired at all, since this reinforcing web 3 is not exposed to the eyes in use. Further, although the inside surface of the sheet of decorative surface material 1 is fused under influence of the heat generated from the heating unit 7 and also from the mold 6 of the high-frequency welder and transmitted through the sheet of untreated polyurethane foam material 2, and the sheet of decorative surface material 1, the sheet of untreated polyurethane foam material 2 and the reinforcing web of fabric material 3 are welded together, the outside surface of sheet of decorative surface material 1 would not be affected by the heat, that is, unattractive scars would not be formed on that surface and the quality of the product would not be degraded.

It may be difficult to dispose the heating surface of the heating unit 7 in exact parallel relation with the mold 6 of the high-frequency welder and to maintain the surface flatness of the heating unit 7 relative to the mold 6 when the product has a wide surface area as in the case of a seat cushion member used to cover a seat of a vehicle. In order to obviate such a difficulty, a sheet of elastic material, for example, heat-resistive artificial rubber such as silicone rubber or a sheet of heat-resistive fabric material may be bonded to the heating surface of the heating unit 7. As another means, a thin metal plate may be fixed to the heating surface of the heating unit 7 in a relation defining a narrow space therebetween, and a cushioning material such as a gas or a liquid at a high temperature may be filled in that space to provide a cushion layer. As still another means, the heating unit 7 may be of the gas or liquid type containing a gas or a liquid at a high temperature. As yet another means, the heating unit 7 itself may be incorporated in a block of elastic material. As another effective means, the heating unit 7 may be split into a plurality of blocks, and one or more thin pieces of suitable material such as a metal may be interposed between the upper plate 4 of the high-frequency welder and the individual blocks of the heating unit 7 to permit adjustment of the relative heights of the individual blocks independently of each other so that a uniform pressure can be vertically imparted to the three-layer laminate. As still another effective means, the mold 6 of the high-frequency welder may be split into a plurality of blocks, and the relative heights of the individual blocks of the mold 6 may be adjusted so as to maintain the desired physical relation between the heating unit 7 and the mold 6.

The method of splitting the heating unit 7 into a plurality of blocks is applied also to automatic adjustment of the temperature of the heat generated from the heating unit 7. A device for attaining this automatic temperature adjustment is required especially when the heating unit 7 has a large heating surface area and extreme difficulty is therefore encountered in making uniform the temperature distribution on the entire surface area, since the undesirable non-uniformity of the temperature distribution will adversely affect the quality and strength of the product to a great extent. It is therefore preferable that a temperature adjusting device of any suitable type is associated with the heating unit 7 and/or the high-frequency welder so that the three-layer laminate can be uniformly heated under application of a uniform molding pressure.

The weldable sheet of decorative surface material 1 may be such that a material not readily fused by heat may be laminated or impregnated with a welding material.

The arrangement of the lead wires, pipes or the like connecting the heating unit 7 to the external source of heat supply will pose a difficult problem when the mold 6 is movable and the heating unit 7 may be arranged to move together with the mold 6. Further, the problem of costs will arise when two or more molds 6 are provided, and two or more heating units 7 associated with these molds 6 respectively are required. In such a case, it is preferable to fix the single heating unit 7 to the upper plate 4 (the pressure imparting part) of the high-frequency welder so that it is not movable relative to the movable mold or molds 6 as seen in FIG. 4 or 5.

Depending on the materials of the layers 1, 2 and 3 constituting the three-layer laminate to be heated, an additional sheet of material such as an electrical insulator which generates heat in itself at the temperature of high-frequency dielectric heating may be interposed between a sheet of, for example, a heat-conductive metal and the three-layer laminate. This additional sheet may be a sheet of empire cloth, a sheet of empire cloth containing glass fibers, a sheet obtained by shaping a mixture of powdery ferrite and a heat-resistive rubber or synthetic resin into a sheet form, or a sheet obtained by coating a web of glass fibers with a synthetic resin resistive to heat. The electrical insulator functions as a heater when the fusing point of the additional sheet subjected to the high-frequency dielectric heating is higher than those of the materials of the three-layers of the laminate to be welded together at the temperature of high-frequency dielectric heating. In such a case, therefore, the temperature of heat generated from the heating unit 7 need not be so high, or the heating unit 7 may be eliminated and the three layers may be welded together by the high-frequency welder alone. Therefore, this additional sheet is one form of the heating means in the present invention. The temperature of heat to be generated from the heating unit 7 can be lowered or the duration of heating can be shortened when such a heating means is used in combination with the heating unit 7.

The heating unit 7 may be disposed outside of the high-frequency welding apparatus, and after preheating the three-layer laminate by the external heating unit 7, the three layers of the laminate may be welded together by the high-frequency welder. The heating unit 7 may be directly incorporated in each of the upper plate 4 and the lower plate 5 of the high-frequency welder, and such heating units 7 may be independently controlled by associated temperature adjusting devices.

Figure 4:
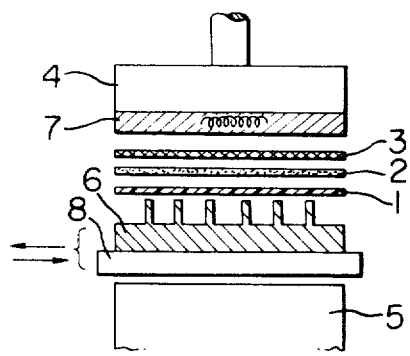
FIG. 4 is a schematic vertical sectional view of still another form of the apparatus in which the mold is mounted on a movable table or shuttle so as to be movable along a straight path relative to the upper and lower plates of the high-frequency welder.
Figure 5:
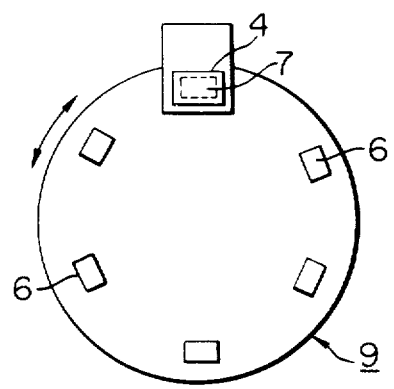
FIG. 5 is a schematic plan view of yet another form of the apparatus in which a plurality of molds are mounted on a turntable so as to be movable along a circular path relative to the upper and lower plates of the high-frequency welder.

Depending on the position of the heating unit 7 and depending on the direction of application of heat from the heating unit 7, one or two or all of the three layers which are the weldable sheet of decorative surface material 1, the sheet of untreated polyurethane foam material 2 and the reinforcing web of fabric material 3 are fused, and these three layers are welded together by the high-frequency welding apparatus shown in FIG. 1, 2 or 4.

The sheet of decorative surface material 1 may also be that of natural fibers or natural leather which is not weldable by application of heat only or may be that of artificial or synthetic fabric which is not weldable by application of heat. In this case, the sheet of untreated polyurethane foam material 2 and the reinforcing web of fabric material 3 may be fused or the sheet of untreated polyurethane foam material 2 only may be fused so that these layers can be welded to each other and to the sheet of decorative surface material 1.

The sheet of decorative surface material 1 is not limited to a single layer and may be a laminate of a plurality of layers, for example, two or three layers of different materials. These layers constituting the sheet of decorative surface material 1 may be welded together during the welding process for producing the seat cushion member of the present invention.

Figure 6:
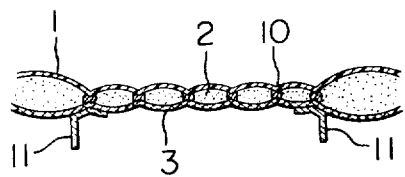
FIG. 6 is a schematic sectional view of part of another form of the seat cushion member having a plurality of pieces of suspension cloth welded thereto.

Referring to FIG. 6, a plurality of pieces of suspension cloth 11 are fixed to the back surface of the seat cushion member so as to form a decorative and functional recess on the outside surface of the sheet of decorative surface material 1 by pulling that portion of the seat cushion member downward during mounting of the seat cushion member on a seat frame (not shown). These pieces of suspension cloth 11 are partly attached to the reinforcing web of fabric material 3 when the web 3 is laminated with the sheet of untreated polyurethane foam material 2 and the sheet of decorative surface material 1, and these pieces of suspension cloth 11 are then welded to the compressed portions 10 in the course of welding the three layers according to the welding method. Such pieces of suspension cloth 11 have been sewn to the seat cushion member of this kind by a sewing machine while consuming many manhours. Such pieces of suspension cloth 11 have also been fixed to the seat cushion member of this kind by the use of a welding material. However, they have not been uniformly welded with a sufficient strength at the weld. In contrast to the prior art cases, the strength of the weld between the pieces of suspension cloth 11 and the reinforcing web of fabric material 3 is remarkably improved compared with the prior art structures because these pieces of suspension cloth 11 are welded during the welding of the three layers 1, 2 and 3 into the integral structure.

Figure 7:
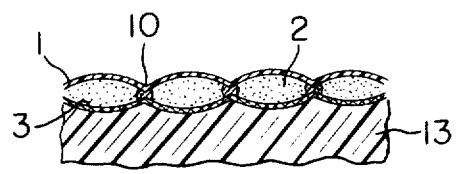
FIG. 7 is a schematic sectional view of part of still another form of the seat cushion member having a filler pad welded thereto.

FIG. 7 is a schematic sectional view of part of another form of the seat cushion member according to the present invention. Referring to FIG. 7, a filler pad 13 is laminated with the reinforcing web of fabric material 3 in the three-layer laminate and is welded to this reinforcing web of fabric material 3 during the welding step welding the three layers 1, 2 and 3 according to the aforementioned method of the present invention. That is, such a filler pad 13 is used in place of a conventional slab material or a conventional molded polyurethane foam material and is integrally welded to the three-layer laminate so as to save the labors required for assembling a seat. The reinforcing web of fabric material 3 may be eliminated, and in such a case, it may be effective to vary the factors including the specific gravity and hardness of the sheet of untreated polyurethane foam material 2 relative to those of the filler pad 13 or to replace the filler pad 13 by a material such as a molded polyurethane foam material.

Figure 8:
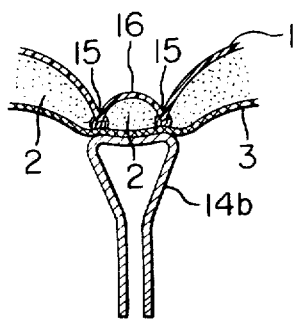
FIG. 8 is a schematic sectional view of part of yet another form of the seat cushion member having a button-like projection formed on the outside surface of the sheet of decorative surface material and having a strip of suspension cloth partly welded to the outside surface of the reinforcing web of fabric material.

FIG. 8 is a schematic sectional view of part of another form of the seat cushion member according to the present invention. Referring to FIG. 8, a plurality of strips of suspension 14b is partly laminated with the reinforcing web of fabric material 3 in the three-layer laminate although only one of them is shown, and a button-like projection 16 defined by a circular compressed portion 15 is formed on the outside surface of the sheet of decorative surface material 1 by suitably altering the design of the mold 6 shown in FIG. 1 and welding the three layers 1, 2 and 3 together while, at the same time, welding that part of the strip 14b to the layer 3 by the combination of the heat generated from the heating unit 7 and the temperature of high-frequency dielectric heating.

Figure 9:
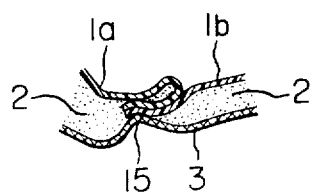
FIG. 9 is a schematic sectional view of part of a further form of the seat cushion member in which the decorative surface layer is provided by welding two sheets of decorative surface material of different colors or patterns in a partly overlapping relation.

FIG. 9 is a schematic sectional view of part of a further form of the seat cushion member according to the present invention. Referring to FIG. 9, two sheets of decorative surface material 1a and 1b of different colors or patterns one disposed in partly overlapping relation to provide the decorative surface layer 1, and these sheets 1a, 1b, the sheet of untreated polyurethane foam material 2 and the reinforcing web of fabric material 3 are welded together to form a compressed portion 15. According to this method, the overlapping portions of the sheets 1a and 1b provide an accent on the decorative surface layer 1. It will be appreciated that attractive seat cushion members can be obtained by suitable combinations of various colors and patterns.

While the present invention has been specifically described with reference to its application to seat cushion members for use as seat covers in vehicles by way of example, the present invention is in no way limited to such a specific application and is also applicable to, for example, interior decorations of vehicle compartments, decorative coverings for walls, ceilings, etc. of house rooms, inner wall coverings of trunk cases and various kinds of furniture.

The method according to the present invention is advantageous over the prior art in that the uniform distribution of the heating temperature improved the strength of the welded products and improves also the surface appearance of the finished products.

When the method according to the present invention is applied to the production of a seat cushion member in which the sheet of decorative surface material 1 is made of a weldable fabric material, the outside surface of the sheet of decorative surface material 1 is not substantially fused or is not fused at all due to the unique temperature gradient across the three-layer laminate, so that objectionable degradation of the quality of the products as well as an unbeautiful external appearance of the products can be obviated.

Further, according to the method of the present invention, a non-fusible sheet of decorative surface material 1 such as that of natural leather or natural fibers can also be satisfactorily welded to the sheet of untreated polyurethane foam material 2 by fusion of the polyurethane foam material.

When the sheet of decorative surface material 1 is a sheet of vinyl resin-based artificial leather, the vinyl resin portion of the sheet of vinyl resin-based artificial leather (to which a thin fabric or a so-called cheesecloth is commonly bonded at the back surface) is fusible at a temperature lower than the fusing points of the materials of the layers 2 and 3 when the heat is simultaneously applied to these layers. According to the method of the present invention, however, the embossed pattern on the outside surface of the sheet of vinyl resin-based artificial leather would not disappear in spite of heating at the high temperature, no unattractive scars would appear on that surface or no re-foaming of the vinyl resin would occur. Therefore, objectionable degradation of the quality of the welded products as well as an unbeautiful external appearance of the finished products can be obviated.

In the case of a prior art seat cushion member, for example, that produced by integral welding of a sheet of decorative surface-providing fabric material, a sheet of untreated polyurethane foam material impregnated with a powdery welding material and a reinforcing web of fabric material, splashing of water on the covering sheet of fabric material and consequent permeation of water into the seat cushion member has resulted in peel-apart of the welded portions or in a reduction of the strength of the welded structure after vaporization of water even when no peel-apart occurs. This is attributable to the fact that the welding material is not resisting to water. The same applies to liquids other than water.

In contrast, according to the method of the present invention, the three layers can be fully satisfactorily welded together without giving rise to the trouble above described, due to the fact that such a welding material is not used.

Further, the use of the powdery welding material in the prior art seat cushion member composed of the components above described, scattering of the powders of the welding material in the course of production has given rise to various problems from the aspects of safety and health of the operators and also from the aspect of environmental pollution. The method according to the present invention obviates all of such problems since no welding material is used.

The seat cushion member produced by the method and apparatus according to the present invention is improved in quality over the prior art ones including the welding material and the weldafoam or the low-melting polyurethane foam material, due to the fact that the untreated polyurethane foam material employed in the present invention is excellent in its physical properties such as the elasticity and the resistance to settling. In addition to the improved quality, the costs can also be reduced, since the untreated polyurethane foam material is inexpensive or its cost is only about half that of the weldafoam and low-melting polyurethane foam material.

What is claimed is:

1. A heat treated seat cover comprising a laminate of a sheet of surface material, a sheet of untreated foam polyurethane material, and a reinforcing fabric material positioned in the above order and characterized in that the surface material, the foam polyurethane material and the reinforcing material are integrally welded together at localized spaced portions thereof by a fused polyurethane sheet formed by high frequency dialectric heating combined with a second, externally applied heat source.

2. A heat treated seat cover as in claim 1, characterized in that the surface material is fusible material and that the upper side of the surface material is less fused than the back side thereof, which back side is adjacent the fused polyurethane layer.

3. A heat treated seat cover as in claim 1, characterized in that the surface material is infusible material.

* * * * *